March 5, 1957  M. K. PAXTON  2,784,103
FROZEN PRE-ROLLED DOUGH PRODUCT
Filed Nov. 18, 1954
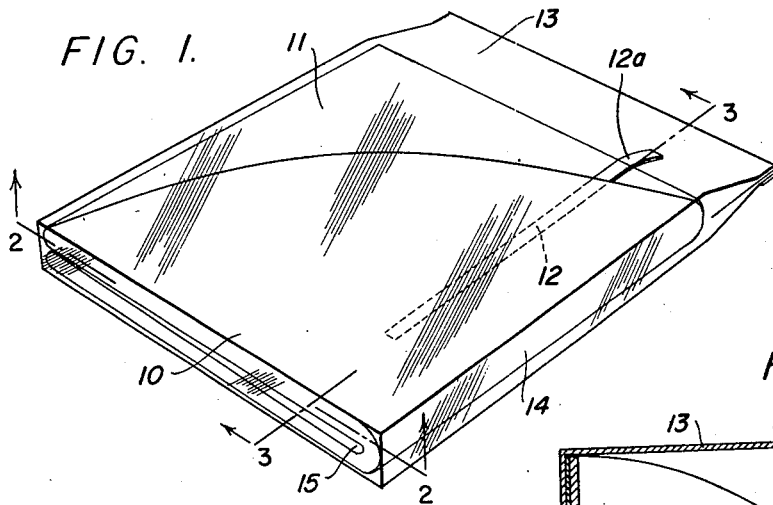
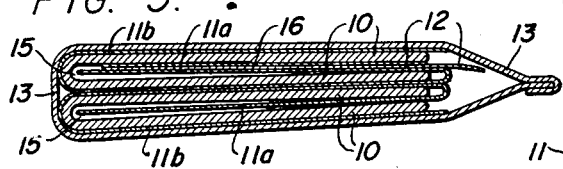
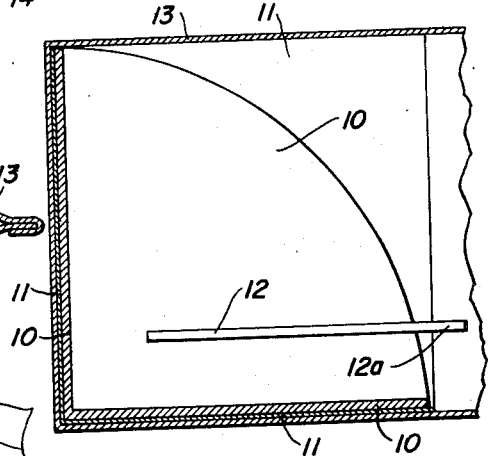
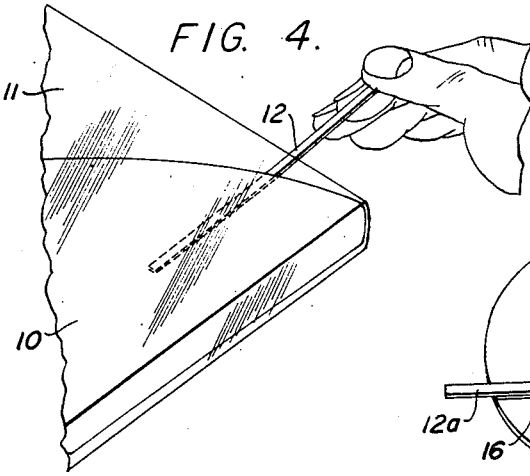
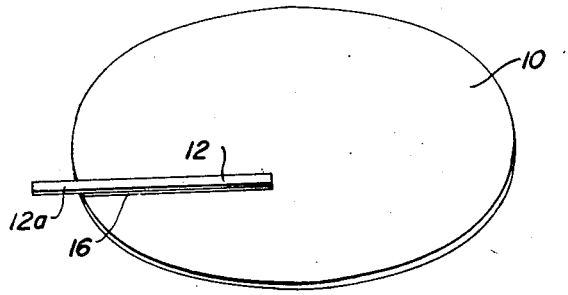
Inventor:
MARION KNIGHT PAXTON,
By H. Mallinckrodt and
Philip A. Mallinckrodt
Attorneys.

United States Patent Office 2,784,103
Patented Mar. 5, 1957

2,784,103

FROZEN PRE-ROLLED DOUGH PRODUCT

Marion Knight Paxton, Monroe, Utah

Application November 18, 1954, Serial No. 469,593

7 Claims. (Cl. 99—172)

This invention relates to frozen, prepared, food items, particularly frozen, pre-rolled sheets of unbaked dough.

In line with the modern trend toward merchandising frozen food items in prepared form ready for cooking or baking by the housewife, various attempts have been made heretofore to market sheets of pre-rolled dough for pie crusts and other uses. Little success has been had, however, due to the necessity of folding the relatively thinly rolled sheets into smaller and more compact form for convenient market handling. When frozen, the sheet of dough is fragile, in the sense that it cannot be satisfactorily unfolded without breakage. It is necessary that the dough be thoroughly thawed before any attempt is made to unfold the sheet.

Thawing proceeds slowly, and it is difficult to determine when the several folds are sufficiently thawed to permit unfolding of the sheet without breaking or tearing it.

A principal object of this invention is to provide a convenient way for enabling the housewife to determine when the dough throughout the product is thawed sufficiently to permit unfolding of the sheet without damage thereto.

Additional objects are to provide the above in a manner that adds little to the packaging expense, does not interfere materially with usual packaging procedures or the use of customary packaging materials, does not have any deleterious or contaminating action on the dough, and is handy for the housewife to use in practice.

An outstanding feature of the invention in the accomplishment of these objects is the incorporation of an indicator pull-strip between mutually adjacent folds of the packaged dough sheet, and the same being frozen into intimate adherence with a contiguous dough surface at the time of freezing the product as a whole.

In use, it is only necessary for the housewife to gently pull on an exposed end of the pull-strip from time to time during the thawing procedure. When the pull-strip yields to such gentle pulling action and pulls free from the dough and from between the folds thereof, the housewife will find it safe to proceed with the unfolding operation. My experience has proven that a strip of this kind is a sure indicator of adequate thawing.

Where the surface of the rolled dough is of such a tacky nature that the indicator pull-strip tends to adhere to it naturally prior to the freezing stage, reasonably satisfactory results are had without more in the way of an adhesive or conditioning agent. Nevertheless, in all instances, it is advantageous to apply raw egg white over that area of the rolled dough to which the indicator pull-strip is applied. This insures positive and satisfactory results under all circumstances.

Further objects and features of the invention will become apparent from the following detailed description of that particular preferred embodiment thereof which is illustrated, by way of example, in the accompanying drawing.

In the drawing:

Fig. 1 represents a perspective view of a typical packaged embodiment of the invention for use as a pie crust when thawed and unfolded;

Fig. 2, a horizontal section taken on the line 2—2 of Fig. 1;

Fig. 3, a vertical section taken on the line 3—3 of Fig. 1;

Fig. 4, a fragmentary portion of Fig. 1 showing the indicator pull-strip being withdrawn from the fully thawed product; and Fig. 5, a perspective view of the rolled dough sheet as it appears both prior to folding and freezing and after being thawed and unfolded for use, the pull-strip being shown positioned ready for the sheet-folding operation, it being understood that such pull-strip is not present when the dough sheet is in its thawed and unfolded condition.

Referring now to the drawing:

The frozen, packaged product of Fig. 1 typifies the application of the invention in practice. It is made up of a frozen, pre-rolled and folded dough sheet 10; interfolded separator sheet 11 of wax paper or the like; indicator pull-strip 12; and protective outer package 13, preferably a transparent bag.

While the dough sheet may be of any desired configuration, the illustrated sheet 10 is circular for use as a pie crust. Its appearance both before and after the freezing and thawing operations is substantially as indicated in Fig. 5.

A handy and easily packaged product is provided by folding the circular dough sheet 10 in quarters prior to freezing, so that it will be in the compact folded form of Fig. 1. It is preferred that a separator sheet be interfolded with the dough sheet. For this purpose, the dough sheet 10 rests on a sheet of waxed paper or the like 11 prior to the folding operation, and such sheet is folded together with the dough sheet.

As illustrated, the wax paper sheet 11 is conveniently and advantageously of rectangular configuration, having a length approximately half again as great as the diameter of the dough sheet 10, so that a panel section 11a thereof, Fig. 3, may be folded over the top of half of the dough sheet 10 prior to the actual folding of the latter. Thereafter, folding of the dough sheet 10 in half, together with the wax paper, along a line of fold 14, Fig. 1, parallel with the initial wax paper fold, places the panel section 11a between the inner, opposing, dough-sheet faces, and places the other panel sections 11b and 11c of the wax paper sheet in covering relationship with the outer dough-sheet faces. The resulting semicircular formation is then folded into the quarter-fold formation of Fig. 1.

None of the folds are pressed together. They are left in the open loop formation naturally assumed, see 15, Fig. 1, and the product is frozen as so folded. The openings 15 provide for circulation of air through the frozen product, which speeds thawing.

Prior to the folding operation, an elongate pull-strip 12 of some suitable cohesive but inert material, such as cellophane, is applied to the surface of the pre-rolled dough sheet 10 adjacent the middle of the sheet, as indicated in Fig. 5. Such pull-strip 12 is pressed lightly against the dough surface, and it is preferred that a thin layer of egg white be applied between the pull-strip face and the dough face which adjoin each other. This may be accomplished by dipping the pull-strip in egg white prior to its application to the dough face, or by coating the strip-receiving area of the dough sheet with egg white. The layer of egg white is here indicated at 16, Fig. 3. An end portion 12a of the pull-strip is left extending freely from the dough sheet as a grasping tab.

The fully folded and pull-strip equipped dough sheet may be frozen prior to or following packaging, and the packaging may be as desired by the producer for properly protecting and displaying the frozen product. It is preferred that a transparent wrap be utilized, for example, a transparent bag 13.

It is preferable from the standpoint of good packaging technique to use a separator sheet, such as the wax paper sheet 11. Nevertheless, whether or not such be used, or whether or not the inner panel section 11a of the wax paper sheet be present, which is an optional packaging procedure, the pull-strip 12 serves as an effective indicator of sufficient thawing to permit the user of the product to unfold the frozen dough sheet without breakage thereof.

The product may be thawed either in or out of the protective bag 13, the latter being preferred because faster. In either case, however, the housewife or other consumer of the product will gently pull on the exposed and free grasping tab 12a of the indicator pull-strip 12 from time to time during the thawing procedure for the purpose of determining when it is safe to commence the unfolding operation with respect to the frozen dough sheet 10. When the pull-strip 12 pulls free from between the contiguous folds of the product, where it was anchored by the freezing operation, the consumer will know that the frozen dough sheet has thawed sufficiently to permit unfolding thereof to proceed without danger of damage thereto.

The thawed and unfolded dough sheet is substantially identical in all respects with the same dough sheet prior to folding and freezing, as is indicated by Fig. 5. Any of the egg white 16 which may remain adherent thereto has no detrimental effect whatsoever. In fact, if anything, it adds to the nutritious character of the product.

The egg white is a particularly satisfactory way of providing for frozen adherence of the pull-strip to the dough surface, inasmuch as it inhibits any tendency toward moisture collection and clamminess of the dough area contiguous with the pull-strip.

The particular configuration of the frozen product is of no importance, except insofar as it may make for convenience of marketing, display, and handling. For these purposes, and in order to insure against breakage such as would occur were the thin dough sheet to be frozen and packaged as such, folding or rolling upon itself in some fashion is essential. Under such circumstances, there are always contiguous surfaces of the pre-frozen product available for the interpositioning of an indicator pull-strip against a dough surface pursuant to this invention.

It appears to make little or no difference between which folds of the product the pull-strip is interposed. As a general rule, however, where there are a considerable number of layers in any given product, it is preferred to place the pull-strip approximately half way between the over-all thickness of the product as made up by the several folds or layers thereof.

From the above, it will be seen that the invention from its broadest standpoint is applicable to any stiffly frozen, flexible sheet material which may be damaged if an attempt is made to unfold or separate component layers thereof before adequately thawed.

Whereas the invention is here illustrated and described with respect to the particular preferred embodiment thereof, it should be understood that various changes in form may be made on the basis of the teachings hereof without departing from the scope of the claims which here follow.

The present application constitutes a continuation-in-part of my copending application Serial No. 376,172, filed August 24, 1953, entitled "Frozen Pie Crust."

I claim:

1. A frozen, pre-rolled, dough product, comprising a pre-rolled sheet of dough overlapped upon itself to provide a plurality of dough layers; and an attenuate pull-strip interposed between two mutually adjacent layers of said product and frozen into adherence with the dough surface of at least one of said layers as a thawing indicator, said pull-strip covering only a minor portion of the total area of said surface.

2. The combination recited in claim 1, wherein a coating of egg white is interposed between the contiguous faces of the indicator pull-strip and of the dough layer to which the indicator pull-strip is adherent.

3. The combination recited in claim 2, wherein the indicator pull-strip is a smooth-faced strip of an inert, homogeneous material.

4. The combination recited in claim 1, wherein a separator sheet is interfolded with the sheet of dough, the pull-strip being interposed between a face of the separator sheet and a face of the dough sheet.

5. A frozen, pre-rolled, pie crust product, comprising a circular, rolled sheet of pie crust dough folded in quarters to provide a plurality of layers of sheet dough; and an attenuate pull-strip interposed between two adjacent layers and frozen into adherence with a sheet dough surface as a thawing indicator, said pull-strip covering only a minor portion of the total area of said surface.

6. The combination recited in claim 5, wherein a coating of egg white is interposed between the contiguous faces of the indicator pull-strip and of the dough layer to which the indicator pull-strip is adherent.

7. The combination recited in claim 5, wherein the areas of fold are of open loop formation.

References Cited in the file of this patent
UNITED STATES PATENTS

| | | |
|---|---|---|
| 1,890,044 | Policastro et al. | Dec. 6, 1932 |
| 2,673,807 | Berg | Mar. 30, 1954 |